Patented Sept. 5, 1939

2,171,594

UNITED STATES PATENT OFFICE 2,171,594

PRESERVATION OF GLANDULAR TISSUES

Ferdinand W. Nitardy, Brooklyn, N. Y., assignor to E. R. Squibb & Sons, New York, N. Y., a corporation of New York No Drawing. Application November 6, 1936, Serial No. 109,495

5 Claims. (Cl. 99—160)

This invention relates to a method of preserving glandular tissues, particularly the livers of such fishes as the cod, halibut, tuna, and salmon.

The vitaminiferous oil obtained from fish livers immediately or shortly after their removal is bland, virtually odorless and tasteless, and golden-yellow. Such prompt extraction, however, is often impractical, if not impossible; for the supply of livers may be so small that in the interest of economy they must first be accumulated, or the extraction plant may be so remote as to necessitate prolonged transportation of the livers. In these circumstances, unless adequate protective measures are taken, the liver tissue undergoes enzymatic decomposition and, upon extraction, yields an unsavory, dark, acrid-smelling oil somewhat similar to that obtained by the old "rotting" process.

Heretofore, livers have been preserved by storage at low temperature (e. g. ice-packing or freezing), or by the addition of chemical agents, among them thymol, copper sulfate, chloroform, zinc chloride, sodium carbonate, and sodium silico-fluoride; but these substances are defective because they retard the enzymatic action only partially and/or introduce toxic substances, causing the oil to have a disagreeable taste or odor, or, as by hydrolysis, accelerating decomposition of the liver and destruction of the contained vitamins.

It is an object of this invention to provide a method whereby glandular tissues, particularly fish livers, may be preserved for indefinite periods under ordinary storage conditions. It is a further object of this invention to provide a method whereby fish livers—principally those distinguished for the high proportion of vitamins contained by their oils—may be so preserved as to facilitate and improve the extraction therefrom of their vitaminiferous oils.

In the practice of this invention, glandular tissues are cooked and then mixed with a boron compound, preferably boric acid or a borate. Liver so treated may be stored and/or shipped with relatively inappreciable putrefactive or enzymatic decomposition; and is especially adapted to give, with comparative ease and with a minimum of solvent, a large yield of vitaminiferous oil of exceptional quality (inter alia, free from certain coloring matter, which apparently remains fixed in the tissue).

Example

Raw livers are washed and cooked and then mixed with, say 1 to 8% (preferably about 4%) of borax or boric acid. The mass may now be suitably packed—hermetic sealing is not required —for storage and/or transportation, and is ultimately extracted in accordance with any of the well-known processes, as by means of a solvent, to obtain therefrom the vitaminiferous oil.

It is to be understood that the foregoing example is merely illustrative and not limitative of the invention, which may be variously otherwise embodied—as with respect to the specific glandular tissues treated, boron compounds used, and procedures followed—within the scope of the appended claims.

I claim:

1. The method of preserving fish livers which comprises cooking them and mixing them with undissolved borax.

2. The method of preserving fish livers which comprises cooking them and mixing them with undissolved boric acid.

3. The method of preserving fish livers which comprises cooking them and mixing them with 1 to 8% of an undissolved compound of the group consisting of boric acid and borax.

4. The method of preserving fish livers which comprises cooking them and mixing them with about 4% of an undissolved compound of the group consisting of boric acid and borax.

5. The method of preserving fish livers which comprises cooking them and mixing them with an undissolved compound of the group consisting of boric acid and borax.

FERDINAND W. NITARDY.